United States Patent
Chao et al.

(10) Patent No.: US 12,368,393 B2
(45) Date of Patent: Jul. 22, 2025

(54) POWER CONVERSION CIRCUIT FOR DRIVING MOTOR AND CONTROL METHOD THEREOF

(71) Applicant: Delta Electronics, Inc., Taoyuan (TW)

(72) Inventors: Kuo-Heng Chao, Taoyuan (TW); Chia-Hsiang Chuang, Taoyuan (TW)

(73) Assignee: Delta Electronics, Inc., Taoyuan (TW)

(*) Notice: Subject to any disclaimer, the term of this patent is extended or adjusted under 35 U.S.C. 154(b) by 289 days.

(21) Appl. No.: 18/195,192

(22) Filed: May 9, 2023

(65) Prior Publication Data
US 2024/0113639 A1    Apr. 4, 2024

(30) Foreign Application Priority Data
Sep. 30, 2022    (CN) .................. 202211209809.6

(51) Int. Cl.
*H02M 7/5395* (2006.01)
*H02M 1/00* (2006.01)
(Continued)

(52) U.S. Cl.
CPC ....... *H02M 7/5395* (2013.01); *H02M 1/0022* (2021.05); *H02M 7/53873* (2013.01); *H02P 27/08* (2013.01)

(58) Field of Classification Search
CPC ........... H02M 7/5395; H02M 7/53873; H02M 1/0022; H02P 27/08
(Continued)

(56) References Cited

U.S. PATENT DOCUMENTS

| | | | |
|---|---|---|---|
| 6,757,185 B2* | 6/2004 | Rojas Romero | H02M 1/4216 363/89 |
| 7,701,740 B2* | 4/2010 | Yamanaka | H02M 5/297 363/149 |

(Continued)

FOREIGN PATENT DOCUMENTS

| | | |
|---|---|---|
| CN | 106100430 A | 11/2016 |
| CN | 110995042 A | 4/2020 |

(Continued)

OTHER PUBLICATIONS

Koroku Nishizawa et al.: "Current Harmonic Reduction Based on Space Vector PWM for DC-Link Capacitors in Three-Phase VSIs Operating Over a Wide Range of Power Factor", IEEE, 2018.

*Primary Examiner* — Yemane Mehari
(74) *Attorney, Agent, or Firm* — KIRTON McCONKIE; Evan R. Witt

(57) ABSTRACT

A power conversion circuit for driving motor and a control method thereof are provided. The control method includes: comparing a control command with a carrier wave to acquire a PWM signal; identifying whether a phase difference between the output voltage and current falls within a range; if the phase difference falling within the range, determining whether a zero-sequence voltage is positive or negative according to the output voltage and current; injecting the zero-sequence voltage into the control command to acquire a synthesized command, and detecting maximum and minimum voltage values of the synthesized command after a period; according to the zero-sequence voltage determined to be positive or negative, selecting the maximum or minimum voltage value to perform a logic reversal operation; after stopping injecting the zero-sequence voltage, acquiring (Continued)

an output expected value; and comparing the output expected value with the carrier wave for adjusting a duty ratio of PWM signal.

15 Claims, 8 Drawing Sheets

(51) Int. Cl.
*H02M 7/5387* (2007.01)
*H02P 27/08* (2006.01)

(58) Field of Classification Search
USPC .......................................................... 363/14
See application file for complete search history.

(56) References Cited

U.S. PATENT DOCUMENTS

| | | | |
|---|---|---|---|
| 10,601,343 B1* | 3/2020 | Lamb | H02M 1/088 |
| 11,165,359 B2* | 11/2021 | Kusama | H02M 3/33584 |
| 2011/0025240 A1* | 2/2011 | Furukawa | H02M 7/5395 |
| | | | 318/400.3 |

FOREIGN PATENT DOCUMENTS

| | | | |
|---|---|---|---|
| CN | 111082688 A | 4/2020 | |
| CN | 112737383 A | 4/2021 | |
| TW | 392998 U | 6/2000 | |
| TW | 201731206 A | 9/2017 | |
| TW | 201947865 A | 12/2019 | |
| TW | 202220366 A | 5/2022 | |
| TW | 795052 B | 3/2023 | |

\* cited by examiner

POWER CONVERSION CIRCUIT FOR DRIVING MOTOR AND CONTROL METHOD THEREOF

CROSS-REFERENCE TO RELATED APPLICATION

This application claims priority to China Patent Application No. 202211209809.6, filed on Sep. 30, 2022, the entire contents of which are incorporated herein by reference for all purposes.

FIELD OF THE INVENTION

The present disclosure relates to a power conversion circuit and a control method thereof, and more particularly to a power conversion circuit for driving motor and a control method thereof.

BACKGROUND OF THE INVENTION

In an application of driving the motor supplied by batteries, the DC bus capacitor ripple is determined by the switching PWM (pulse width modulation) assembly of the driver. Conventionally, PWM switching vectors are recombined to reduce the ripple, however it is hard to implement due to complicated calculation process. In another approach, based on a triangle carrier wave, the AZSVPWM (active zero state space vector pulse width modulation) is used with zero-sequence injection to redistribute the vectors and minimize the capacitor ripple at the same time. However, in general, the PWM module of microprocessor doesn't support reversing the triangle wave. Even if the triangle carrier wave is reversed, the required dead time of the upper and lower bridge switches cannot be generated. Therefore, an FPGA (field programmable gate array) has to be disposed additionally outside the microprocessor to process particular PWM for reversing the triangle carrier wave and introducing the dead time. Further, the process of reversing the triangle carrier wave would cause additional switching. Accordingly, in traction motor applications, the switching frequency would be increased under high-speed operation.

Therefore, there is a need of providing a power conversion circuit for driving motor and a control method thereof in order to overcome the drawbacks of the conventional technologies.

SUMMARY OF THE INVENTION

The present disclosure provides a power conversion circuit for driving motor and a control method thereof to reconstruct the vectors through reversing the determination logic rather than the carrier wave. Consequently, the capacitor ripple is reduced, thereby reducing the temperature increment of capacitor and lengthening the lifespan of capacitor. Meanwhile, the driving loss of motor is reduced, and the driving efficiency is improved. In addition, the control method of the present disclosure may be implemented by the existing controller (e.g., microprocessor) to realize the PWM, and no additional hardware (e.g., FPGA) is required for processing PWM.

In accordance with an aspect of the present disclosure, a control method of a power conversion circuit is provided. The control method includes: comparing a three-phase control command with a control carrier wave to acquire a PWM signal; providing the PWM signal to drive a plurality of switches of the power conversion circuit to switch an input power for generating a three-phase output power; identifying whether a phase difference between a voltage and a current of the three-phase output power falls within a preset phase range; if the phase difference falling within the preset phase range, determining whether a zero-sequence voltage is a positive voltage or a negative voltage according to the voltage and the current of the three-phase output power; injecting the zero-sequence voltage into the three-phase control command to acquire a three-phase synthesized command, and detecting a maximum voltage value and a minimum voltage value of the three-phase synthesized command after a period of time; according to the zero-sequence voltage determined to be the positive voltage or the negative voltage, selecting the maximum voltage value or the minimum voltage value to perform a logic reversal operation; after completing the logic reversal operation and stopping injecting the zero-sequence voltage, acquiring a three-phase output expected value; and comparing the three-phase output expected value with the control carrier wave for adjusting a duty ratio of the PWM signal.

In accordance with another aspect of the present disclosure, a power conversion circuit for driving a motor is provided. The power conversion circuit includes a plurality of switch assemblies, a DC bus capacitor and a controller. Each switch assembly includes an upper bridge transistor and a lower bridge transistor. The first terminals of all the upper bridge transistors are electrically connected to each other, and the second terminals of all the lower bridge transistors are electrically connected to each other. In each switch assembly, a second terminal of the upper bridge transistor is electrically connected to a first terminal of the lower bridge transistor. The DC bus capacitor is configured to receive an input power. A first terminal of the DC bus capacitor is electrically connected to the first terminals of all the upper bridge transistors, and a second terminal of the DC bus capacitors is electrically connected to the second terminals of all the lower bridge transistors. The controller compares a three-phase control command with a control carrier wave to acquire a plurality of PWM signals. Each switch assembly receives a corresponding one PWM signal. In each switch assembly, according to the received corresponding one PWM signal, the upper bridge transistor is selectively turned on or off, and the lower bridge transistor is selectively turned on or off. The plurality of switch assemblies switches the input power to generate a three-phase output power for driving the motor. If the controller identifies that a phase difference between a voltage and a current of the three-phase output power does not fall within a preset phase range, the controller detects a minimum control voltage of the three-phase control command. The controller performs a logic reversal operation on the minimum control voltage to acquire a three-phase output command. The controller compares the three-phase output command with the control carrier wave for adjusting a duty ratio of each PWM signal.

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
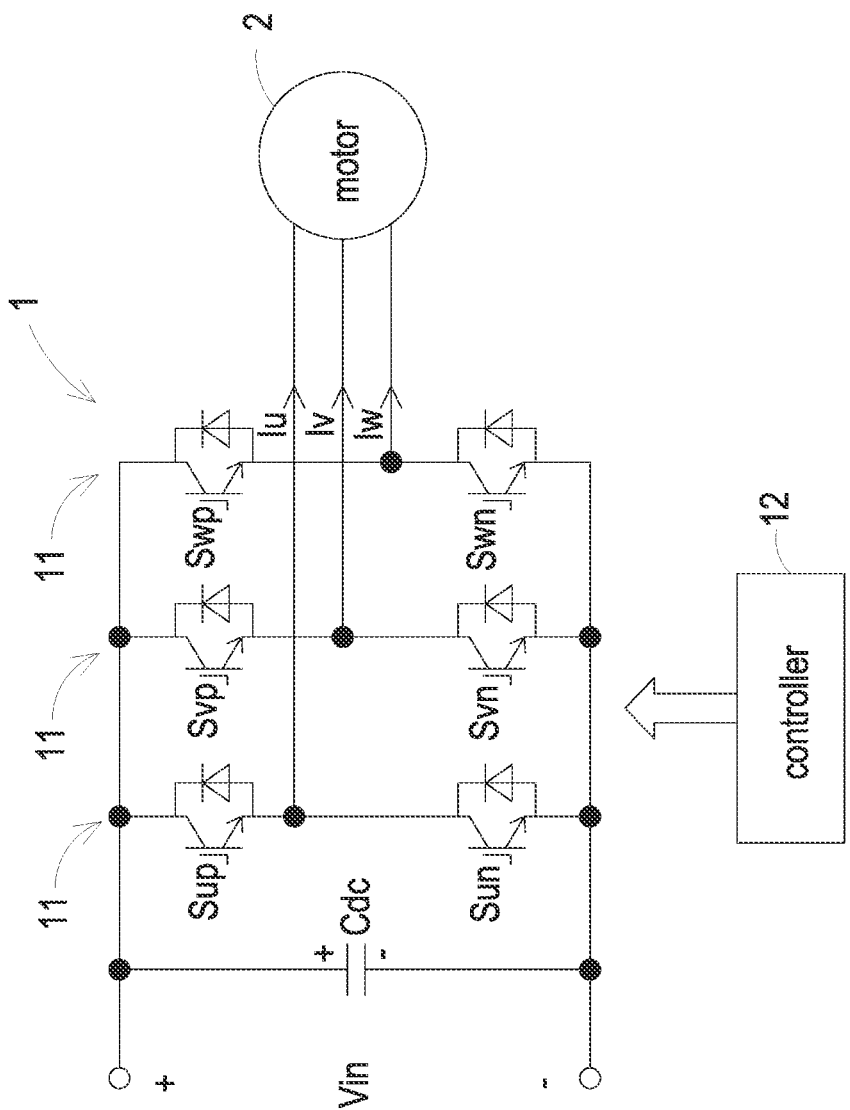
FIG. 1 is a schematic circuit diagram illustrating a power conversion circuit according to an embodiment of the present disclosure.

FIG. 1 is a schematic circuit diagram illustrating a power conversion circuit according to an embodiment of the present disclosure. As shown in FIG. 1, the power conversion circuit 1 is configured to drive a motor 2, and the power conversion circuit 1 includes a plurality of switch assembly 11 (e.g., the three switch assemblies 11 shown in FIG. 1), a DC bus capacitor Cdc and a controller 12. Each switch assembly 11 includes an upper bridge transistor and a lower bridge transistor. The first terminals of all the upper bridge transistors are electrically connected to each other, and the second terminals of all the lower bridge transistors are electrically connected to each other. In each switch assembly 11, the second terminal of the upper bridge transistor is electrically connected to the first terminal of the lower bridge transistor. In the embodiment shown in FIG. 1, the first switch assembly 11 includes the upper bridge transistor Sup and the lower bridge transistor Sun, the second switch assembly 11 includes the upper bridge transistor Svp and the lower bridge transistor Svn, and the third switch assembly 11 includes the upper bridge transistor Swp and the lower bridge transistor Swn. The first terminals of the upper bridge transistors Sup, Svp and Swp are electrically connected to each other, and the second terminals of the lower bridge transistors Sun, Svn and Swn are electrically connected to each other. The second terminals of the upper bridge transistors Sup, Svp and Swp are electrically connected to the first terminals of the lower bridge transistors Sun, Svn and Swn respectively.

The DC bus capacitor Cdc is configured to receive an input power Vin. A first terminal of the DC bus capacitor Cdc is electrically connected to the first terminals of all the upper bridge transistor (Sup, Svp and Swp), and a second terminal of the DC bus capacitor Cdc is electrically connected to the second terminals of all the lower bridge transistor (Sun, Svn and Swn).

The controller 12 compares a three-phase control command with a control carrier wave to acquire a plurality of PWM signals. Each switch assembly 11 receives a corresponding PWM signal. Further, in each switch assembly 11, according to the received corresponding PWM signal, the upper bridge transistor is selectively turned on or off, and the lower bridge transistor is selectively turned on or off. Accordingly, all the switch assemblies 11 switch the input power Vin to generate a three-phase output power for driving the motor 2. The three-phase output power includes three output phases u, v and w, and the currents in the three output phases u, v and w are Iu, Iv and Iw respectively. In addition, the three-phase control command includes voltage commands of the three output phases u, v and w.

Figure 2:
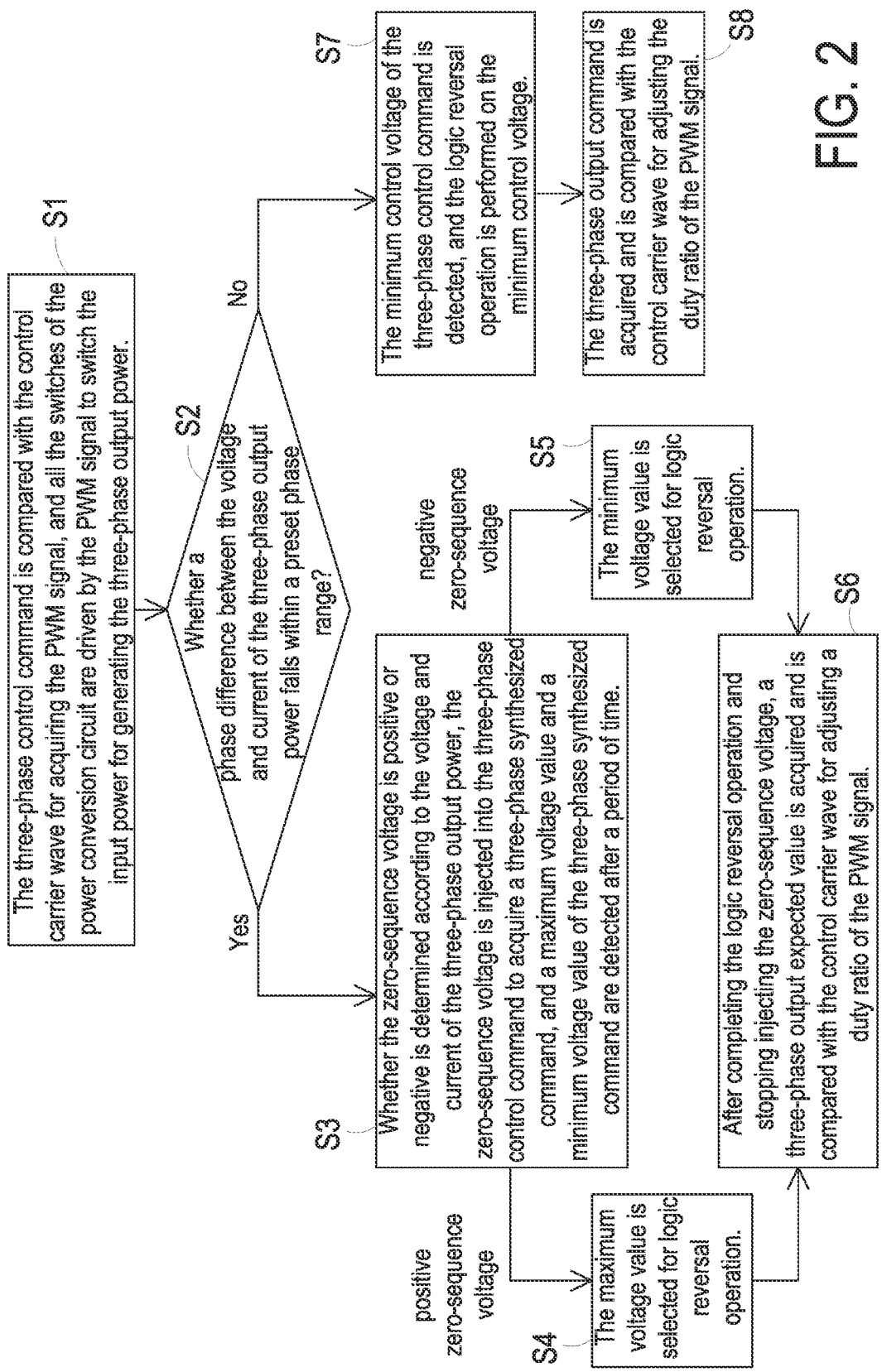
FIG. 2 is a schematic flow chart illustrating a control method of a power conversion circuit according to an embodiment of the present disclosure.

Please refer to FIG. 1 and FIG. 2. FIG. 2 is a schematic flow chart illustrating a control method of a power conversion circuit according to an embodiment of the present disclosure. In the present disclosure, the control method of FIG. 2 is implemented by the controller 12 of FIG. 1 for controlling the power conversion circuit 1. As shown in FIG. 1 and FIG. 2, firstly, in step S1, the three-phase control command is compared with the control carrier wave for acquiring the PWM signal, and all the switches of the power conversion circuit 1 are driven by the PWM signal to switch the input power Vin for generating the three-phase output power. The switches of the power conversion circuit 1 include the upper bridge transistors (Sup, Svp and Swp) and the lower bridge transistors (Sun, Svn and Swn) of all the switch assemblies 11. Then, in step S2, it is detected and identified whether a phase difference between the voltage and current of the three-phase output power falls within a preset phase range, where the preset phase range is preferably between −30° and +30° or between 150° and 210°. If it is identified that the phase difference falls within the preset phase range in step S2, step S3 is performed. In step S3, whether the zero-sequence voltage is a positive voltage or a negative voltage is determined according to the voltage and current of the three-phase output power, the zero-sequence voltage is injected into the three-phase control command to acquire a three-phase synthesized command, and a maximum voltage value and a minimum voltage value of the three-phase synthesized command are detected after a period of time. Afterwards, according to the zero-sequence voltage determined to be the positive voltage or the negative voltage, the maximum voltage value or the minimum voltage value of the three-phase synthesized command is selected to perform a logic reversal operation. In specific, if the zero-sequence voltage is determined to be the positive voltage in step S3, step S4 is performed to select the maximum voltage value of the three-phase synthesized command for logic reversal operation. On the contrary, if the zero-sequence voltage is determined to be the negative voltage in step S3, step S5 is performed to select the minimum voltage value of the three-phase synthesized command for logic reversal operation. Finally, in step S6, after completing the logic reversal operation and stopping injecting the zero-sequence voltage, a three-phase output expected value is acquired and is compared with the control carrier wave for adjusting a duty ratio of the PWM signal.

Otherwise, if it is identified that the phase difference does not fall within the preset phase range in step S2, step S7 is performed. In step S7, a minimum control voltage of the three-phase control command is detected, and the logic reversal operation is performed on the minimum control voltage. Then, in step S8, after completing the logic reversal operation on the minimum control voltage, a three-phase output command is acquired and is compared with the control carrier wave for adjusting the duty ratio of the PWM signal.

From the above, it can be seen that the power conversion circuit 1 for driving motor 2 and the control method thereof reconstruct the vectors through reversing the determination logic rather than the carrier wave. Consequently, the capacitor ripple is reduced, thereby reducing the temperature increment of the DC bus capacitor Cdc and lengthening the lifespan of the DC bus capacitor Cdc. Meanwhile, the driving loss of motor 2 is reduced, and the driving efficiency is improved. In addition, the control method of the present disclosure may be implemented by the existing controller 12 (e.g., microprocessor) to realize the PWM, and no additional hardware (e.g., FPGA) is required for processing PWM.

The control method of the power conversion circuit 1 of the present invention would be described in detail as follows with an example. It should be noted that the control method described as follows are all performed by the controller 12 of the power conversion circuit 1.

Figure 3:
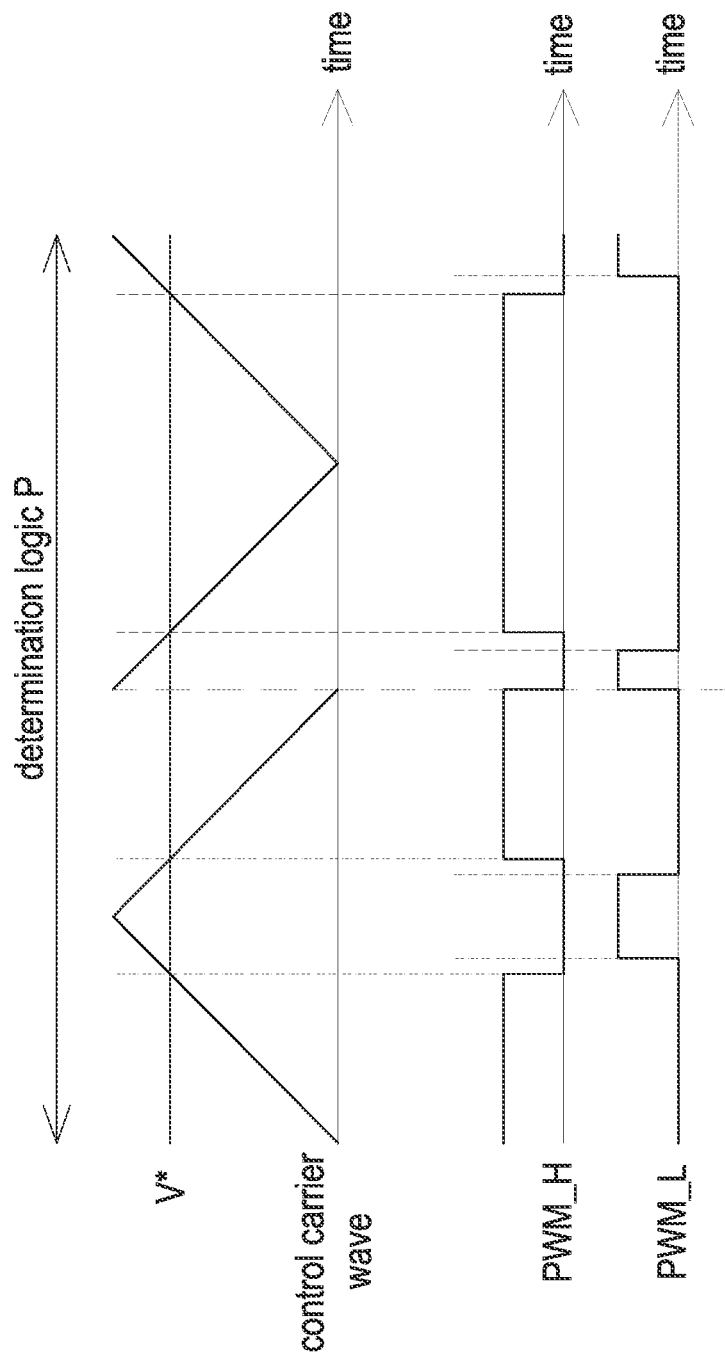
FIG. 3 schematically shows the waveforms while reversing the control carrier.
Figure 4:
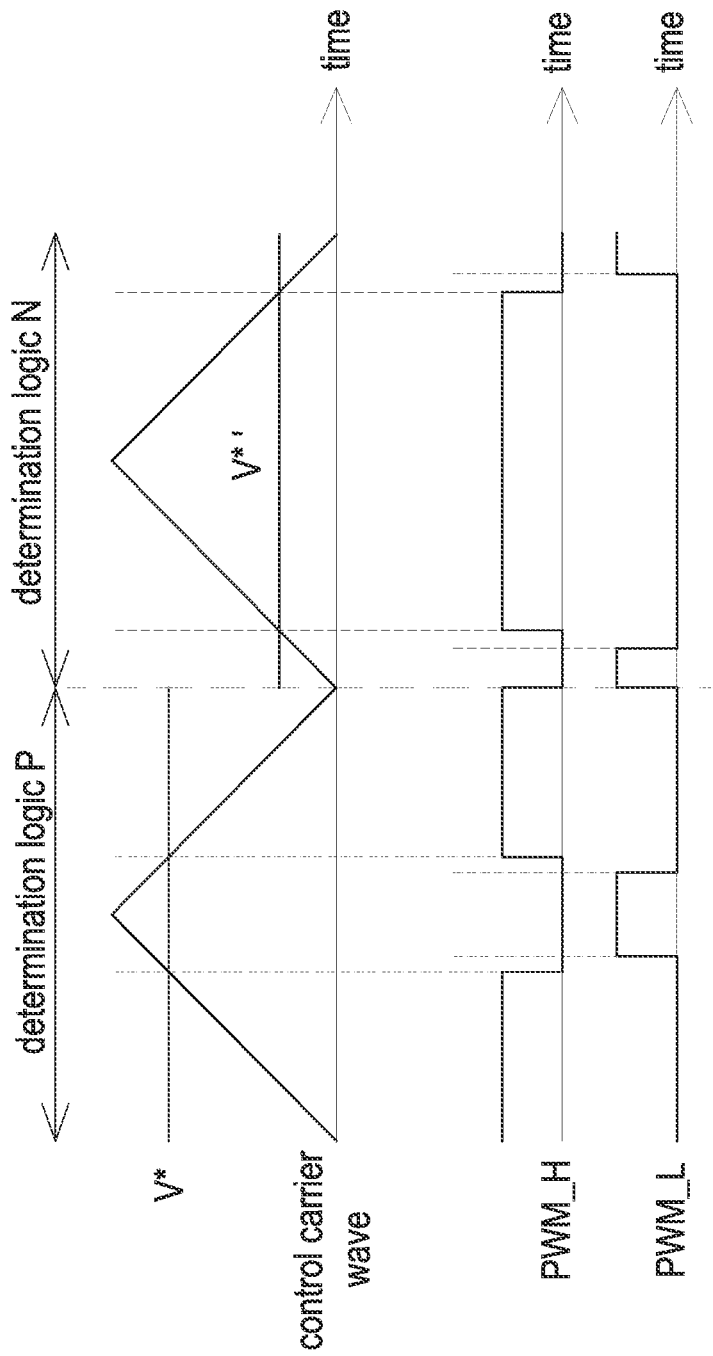
FIG. 4 schematically shows the waveforms while reversing the determination logic.

Taking any one of the output phases as an example, FIG. 3 schematically shows the waveforms while reversing the control carrier, and FIG. 4 schematically shows the waveforms while reversing the determination logic. In FIG. 3 and FIG. 4, the control carrier is a triangle wave, V* is the voltage command, and PWM_H and PWM_L are the control signals (included by the PWM signal) of the upper bridge transistor and the lower bridge transistor of the corresponding switch assembly 11. It should be noted that V* may be the voltage command of any output phase u, v or w of the three-phase control command. In FIG. 3, the waveform of the control carrier is reversed, and no matter before or after the reversal, the determination logic P is adopted to determine whether the PWM signal is at high voltage level or low voltage level according to the comparison result of the voltage command V* and the control carrier wave. In the determination logic P, if the voltage command V* is greater than the control carrier wave, the PWM signal is switched to high voltage level (i.e., the control signal PWM_H is at high voltage level). On the contrary, if the voltage command V* is less than the control carrier wave, the PWM signal is switched to low voltage level (i.e., the control signal PWM_H is at low voltage level). In FIG. 4, the determination logic and the voltage command V* are reversed. The determination logic P and the determination logic N are adopted before and after the reversal respectively to determine whether the PWM signal is at high voltage level or low voltage level. Further, the logic reversal operation is performed on the voltage command V* during the reversal. The determination logic P adopted before the reversal is the same as that described above, and thus the detailed descriptions thereof are omitted herein. During the reversal, the logic reversal operation is performed on the voltage command V* according to a logic reversal equation:

$$V^{*\prime} = 1 - V^* \quad (1),$$

where $V^{*\prime}$ is the voltage command after the logic reversal operation is completed. In the determination logic N adopted after the reversal, if the voltage command $V^{*\prime}$ is greater than the control carrier wave, the PWM signal is switched to low voltage level (i.e., the control signal PWM_H is at low voltage level). On the contrary, if the voltage command $V^{*\prime}$ is less than the control carrier wave, the PWM signal is switched to high voltage level (i.e., the control signal PWM_H is at high voltage level). It is noted that if the logic reversal operation is performed on the voltage command, the corresponding determination logic is also reversed. On the contrary, if the logic reversal operation is not performed on the voltage command, the corresponding determination logic remains unchanged.

As shown in FIG. 3 and FIG. 4, no matter reversing the control carrier wave or reversing the determination logic, the PWM signal is the same. It is noted that the control signal PWM_L of the lower bridge transistor is approximately complementary to the control signal PWM_H of the high bridge transistor. In the period before or after the reversal, there is a dead time between the time of switching the upper bridge transistor and the time of switching the lower bridge transistor. While during the reversal, the upper bridge transistor and the lower bridge transistor are switched synchronously without the dead time.

Under the circumstance that the phase difference between the voltage and current of the three-phase output power does not fall within the preset phase range, the minimum control voltage of the three-phase control command (i.e., the minimum of the voltage commands of the three output phases u, v and w) is detected. The logic reversal operation is performed on the minimum control voltage according to the logic reversal equation shown as equation (1), and the voltage commands of the other two output phases remain unchanged, thereby acquiring the three-phase output command. In detail, the three-phase output command includes the minimum control voltage after performing the logic reversal operation, and the three-phase output command further includes the voltage commands of the other two output phases. Then, the duty ratio of the PWM signal is adjusted through comparing the three-phase output command with the control carrier wave. It is noted that the minimum control voltage after performing the logic reversal operation is compared with the control carrier wave based on the determination logic P, and the voltage commands of the other two output phases are compared with the control carrier wave based on the determination logic N.

Figure 5:
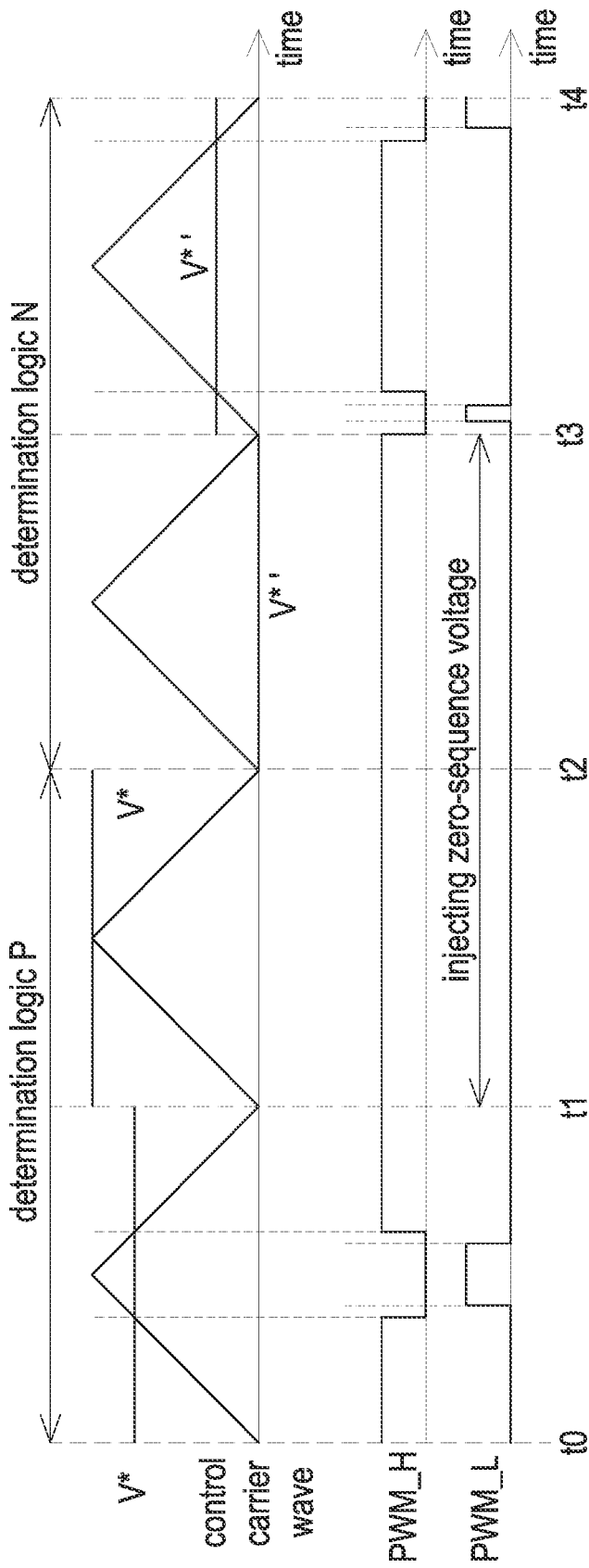
FIG. 5 schematically shows the waveforms while injecting the zero-sequence voltage into the three-phase control command.

In addition, under the circumstance that the phase difference between the voltage and current of the three-phase output power falls within the preset phase range, the zero-sequence voltage is injected into the three-phase control command to prevent the absence of dead time during reversal from causing the shoot-through in the upper and lower bridge transistors and affecting the circuit reliability. FIG. 5 schematically shows the waveforms while injecting the zero-sequence voltage into the three-phase control command. In the example of FIG. 5, the zero-sequence voltage is a positive voltage, and the maximum voltage command of the three-phase control command is exemplified. As shown in FIG. 5, at time t1, the zero-sequence voltage is injected into the voltage command V*. When the zero-sequence voltage is a positive voltage, the magnitude of the zero-sequence voltage is equal to the difference between the maximum voltage command V* and the peak value of the control carrier wave. Alternatively, when the zero-sequence voltage is a negative voltage, the magnitude of the zero-sequence voltage is equal to the difference between the minimum voltage command and the valley value of the control carrier wave. Then, at time t2, the determination logic P is reversed to be the determination logic N, and the logic reversal operation is performed on the voltage command V* according to the logic reversal equation shown as equation (1) for acquiring the voltage command $V^{*\prime}$. Finally, stopping injecting the zero-sequence voltage at time t3. During the period from time t3 to t4, based on the determination logic N, the voltage command $V^{*\prime}$ into which the zero-sequence voltage is not injected is compared with the control carrier wave for adjusting the duty ratio of the PWM signal of the corresponding switch assembly 11. In the example shown in FIG. 5, during the period from time t1 to t2 or the period from time t2 to t3, there is the control carrier wave of one cycle, but not limited thereto actually. There may be the control carrier wave of a plurality of cycles during the period from time t1 to time t2 or the period from time t2 to t3.

According to FIG. 5, during the period from time t1 to t2, the voltage command V* into which the zero-sequence voltage is injected remains equal to the peak value of the control carrier wave. Therefore, based on the determination logic P, the control signal PWM_H of the upper bridge transistor remains at high voltage level, and the control signal PWM_L of the lower bridge transistor remains at low voltage level. During the period from time t2 to t3, the voltage command V*' into which the zero-sequence voltage is injected remains equal to the valley value of the control carrier wave. Therefore, based on the determination logic N, the control signal PWM_H of the upper bridge transistor remains at high voltage level, and the control signal PWM_L remains at low voltage level. Consequently, at time t2, i.e., while reversing logic and performing the logic reversal operation, neither the upper bridge transistor nor the lower bridge transistor is switched. Thereby, the shoot-through in the upper and lower bridge transistors caused by the synchronous switching (i.e., no dead time) of the upper bridge transistor and the lower bridge transistor while reversing logic is prevented, and thus the circuit reliability is improved. In an embodiment, before injecting the zero-sequence voltage into the three-phase control command, the duty ratio of the PWM signal is adjusted to 100% or 0%.

Figure 6:
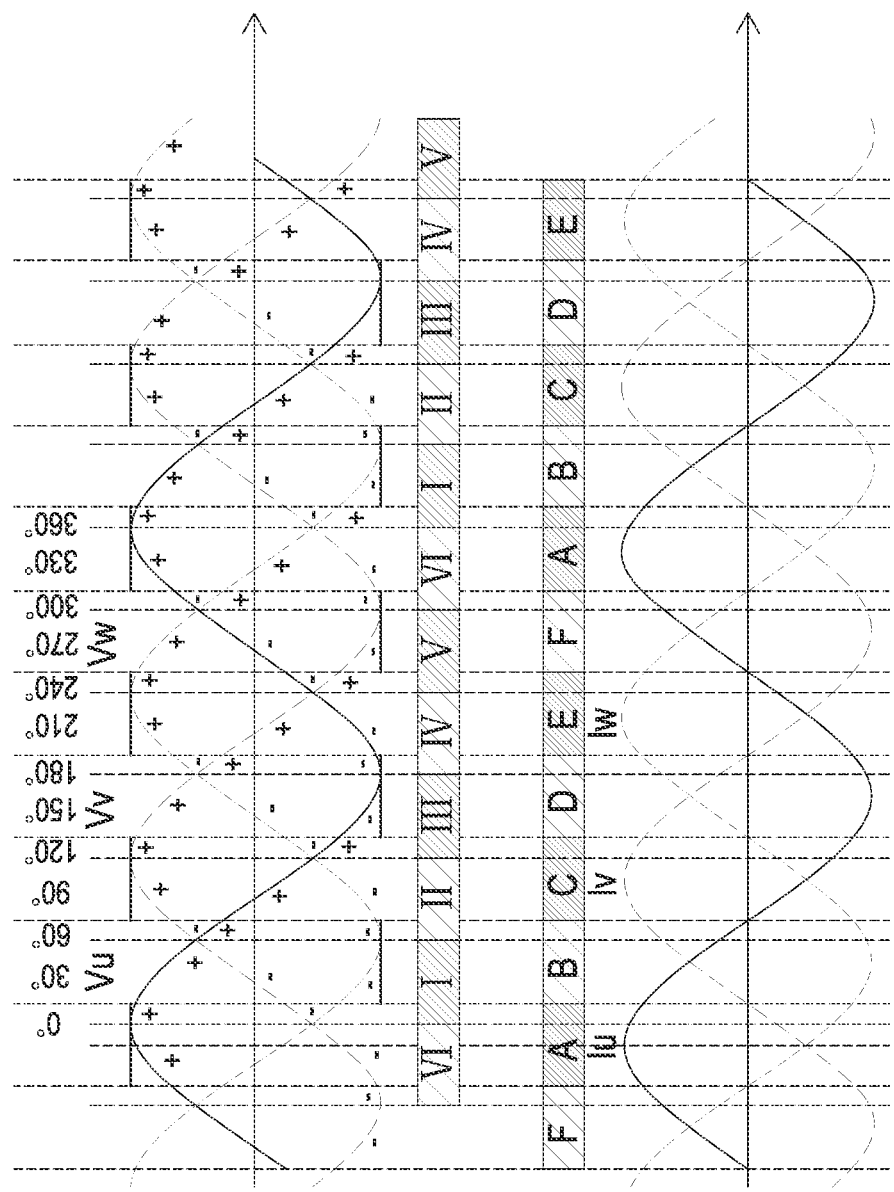
FIG. 6 is a schematic oscillogram showing the voltage and current of the three-phase output power.

FIG. 6 is exemplified for showing how to determine whether the zero-sequence voltage is positive or negative voltage according to the voltage and current of the three-phase output power.

FIG. 6 is a schematic oscillogram of the voltage and current of the three-phase output power. In FIG. 6, the phase difference between the voltage and current falls within the preset phase range, Vu, Vv and Vw are the voltages of the three output phases u, v and w of the three-phase output power respectively, and the waveforms of the voltages Vu, Vv and Vw are depicted by solid lines, dashed lines and dot-and-chain lines respectively. Iu, Iv and Iw are the currents of the three output phases u, v and w of the three-phase output power respectively, and the waveforms of the currents Iu, Iv and Iw are depicted by solid lines, dashed lines and dot-and-chain lines respectively. The "+" marked beside the waveform represents that the determination logic P is adopted, and the "−" marked beside the waveform represents that the determination logic N is adopted. The range of the voltage phase angle is different in the voltage sections I, II, III, IV, V and VI, as shown in table 1. The polarities (positive or negative) of the currents Iu, Iv and Iw are different in the current sections A, B, C, D, E and F, as shown in table 2.

TABLE 1

| voltage section | voltage phase angle (degrees) |
| --- | --- |
| I | 0~60 |
| II | 60~120 |
| III | 120~180 |
| IV | 180~240 |
| V | 240~300 |
| VI | 300~360 |

TABLE 2

| current section | Iu | Iv | Iw |
| --- | --- | --- | --- |
| A | >0 | <0 | <0 |
| B | >0 | >0 | <0 |
| C | <0 | >0 | <0 |

TABLE 2-continued

| current section | Iu | Iv | Iw |
| --- | --- | --- | --- |
| D | <0 | >0 | >0 |
| E | <0 | <0 | >0 |
| F | >0 | <0 | >0 |

After identifying the voltage and current sections in which the voltage and current of the three-phase output power are through table 1 and table 2, whether the zero-sequence voltage is a positive voltage or a negative voltage is determined according to table 3. In table 3, Vz+ represents that the zero-sequence voltage is a positive voltage, Vz− represents that the zero-sequence voltage is a negative voltage, and Vz0 represents that the zero-sequence voltage may be selectively chosen to be a positive voltage or a negative voltage.

TABLE 3

| zero-sequence voltage | current section | | | | | |
| --- | --- | --- | --- | --- | --- | --- |
| | A | B | C | D | E | F |
| voltage section I | Vz+ | Vz− | Vz0 | Vz+ | Vz− | Vz0 |
| II | Vz0 | Vz− | Vz+ | Vz0 | Vz− | Vz+ |
| III | Vz− | Vz0 | Vz+ | Vz− | Vz0 | Vz+ |
| IV | Vz− | Vz+ | Vz0 | Vz− | Vz+ | Vz0 |
| V | Vz0 | Vz+ | Vz− | Vz0 | Vz+ | Vz− |
| VI | Vz+ | Vz0 | Vz− | Vz+ | Vz0 | Vz− |

Ideally, the voltages Vu, Vv and Vw and the currents Iu, Iv and Iw are consistent with the voltage and current commands of the three-phase control command. Accordingly, in an embodiment, whether the zero-sequence voltage is a positive voltage or a negative voltage may be determined according to the voltage and current commands of the three-phase control command.

Figure 7:
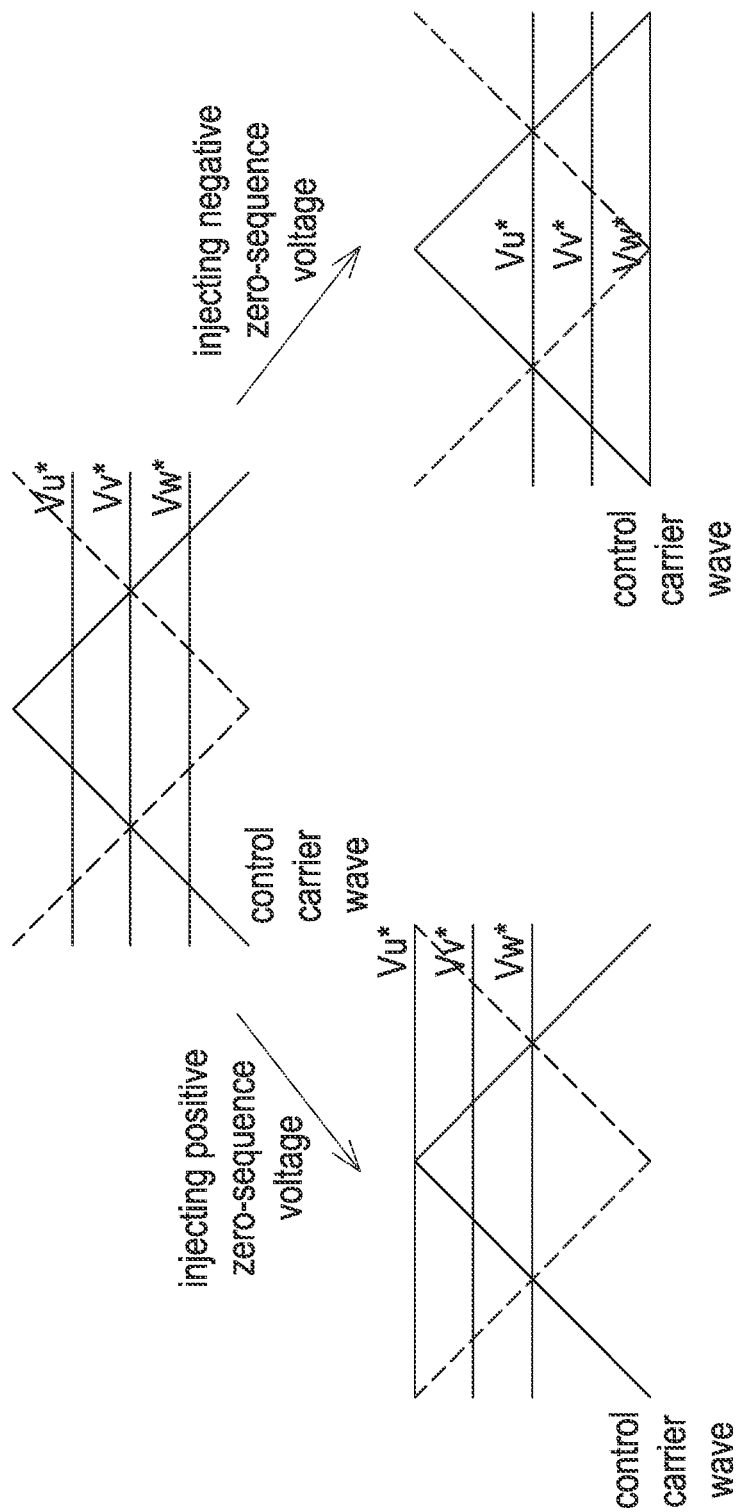
FIG. 7 schematically shows the variation of waveforms caused by injecting the zero-sequence voltage into the three-phase control command.

FIG. 7 schematically shows the variation of waveforms caused by injecting the zero-sequence voltage into the three-phase control command. In FIG. 7, the three-phase control command includes the voltage commands Vu*, Vv* and Vw* of the three output phases u, v and w, and the voltage commands Vu*, Vv* and Vw* are the maximum value, the intermediate value and the minimum value of the three-phase control command respectively. Further, in FIG. 7, the peak and valley of the control carrier wave are exemplified by solid lines and dashed lines respectively. In an embodiment, after determining that the zero-sequence voltage is a positive voltage, the maximum value of the three-phase control command (i.e., the voltage command Vu*) is detected, and the peak value of the control carrier wave in the switching cycle is detected. Then, a first voltage difference between the peak value and the maximum value of the three-phase control command is calculated, and the first voltage difference is the voltage value of the positive voltage (i.e., the voltage value of the zero-sequence voltage). Finally, the voltage value of the positive voltage is superposed on the three-phase control command to form the three-phase synthesized command. In another embodiment, after determining that the zero-sequence voltage is a negative voltage, the minimum value of the three-phase control command (i.e., the voltage command Vw*) is detected, and the valley value of the control carrier wave in the switching cycle is detected. Then, a second voltage difference between the valley value and the minimum value of the three-phase control command is calculated, and the second voltage difference is the voltage value of the negative voltage (i.e., the voltage value of the zero-sequence voltage). Finally, the voltage value of the negative voltage is superposed on the three-phase control command to form the three-phase synthesized command.

Figure 8:
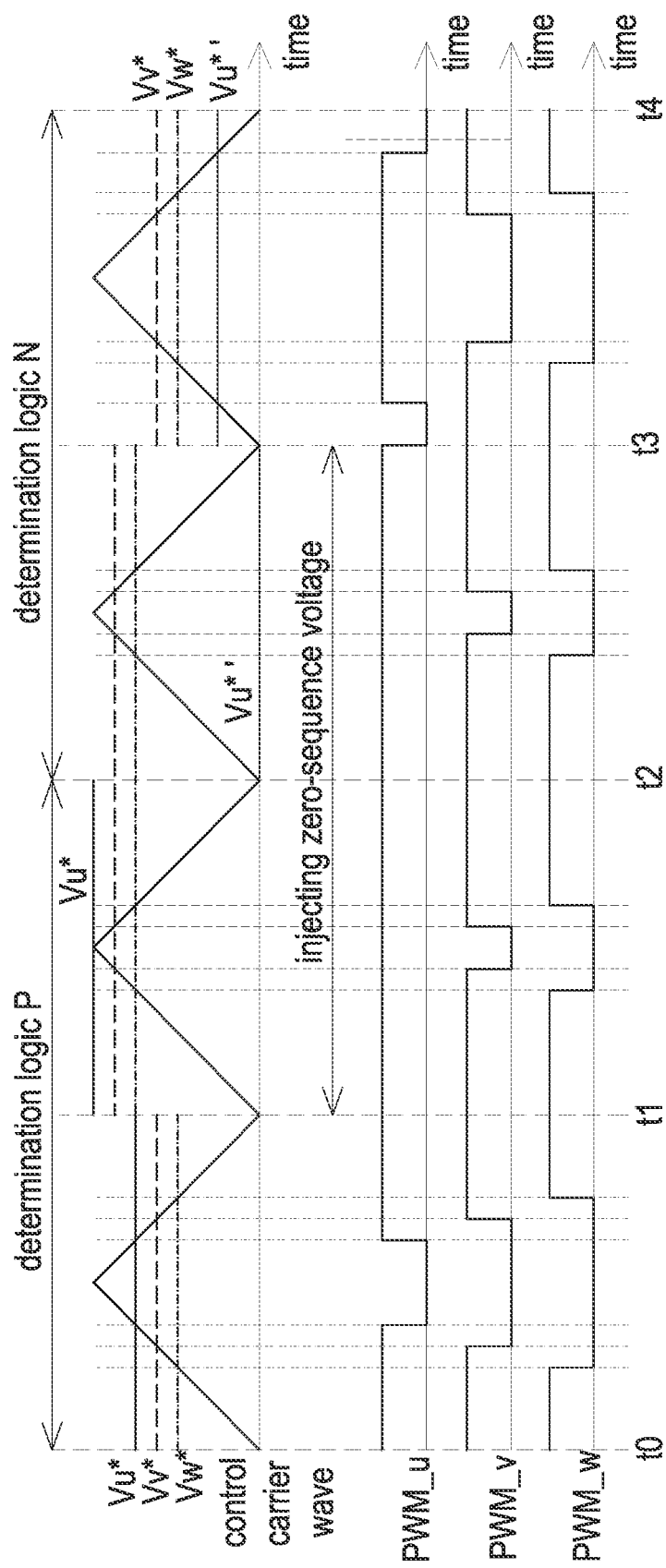
FIG. 8 schematically shows the waveforms of the PWM signals of the output phases while injecting the zero-sequence voltage into the three-phase control command.

FIG. 8 schematically shows the waveforms of the PWM signals of the output phases while injecting the zero-sequence voltage into the three-phase control command. In the embodiment shown in FIG. 8, $Vu^{*'}$ is the voltage command acquired through performing the logic reversal operation on the voltage command $Vu^*$, and PWM_u, PWM_v and PWM_w are the control signals of the upper bridge transistors Sup, Svp and Swp of the switch assemblies 11 corresponding to the output phases u, v and w respectively. In FIG. 8, the waveforms of the voltage commands $Vu^*$ and $Vu^{*'}$ are depicted by solid lines, the waveform of the voltage command $Vv^*$ is depicted by dashed lines, and the waveform of the voltage command $Vw^*$ is depicted by dot-and-chain lines. As shown in FIG. 8, under the circumstance that the phase difference between the voltage and current of the three-phase output power falls within the preset phase range, at time t1, the zero-sequence voltage is injected into the three-phase control command (including voltage commands $Vu^*$, $Vv^*$ and $Vw^*$), and the zero-sequence voltage is a positive voltage in this embodiment. The voltage commands $Vu^*$, $Vv^*$ and $Vw^*$ into which the zero-sequence voltage is injected form a three-phase synthesized command. After a period of time (i.e., the period from time t1 to t2), the maximum voltage value and the minimum voltage value of the three-phase synthesized command are detected. In this embodiment, the maximum voltage value and the minimum voltage value of the three-phase synthesized command are respectively the voltage commands $Vu^*$ and $Vw^*$ into which the zero-sequence voltage is injected. Since the zero-sequence voltage is a positive voltage, the maximum voltage value of the three-phase synthesized command (i.e., the voltage command $Vu^*$) is selected at time t2, and the logic reversal operation is performed on the maximum voltage value according to the logic reversal equation as shown in equation (1) for acquiring the voltage command $Vu^{*'}$. At time t3, stopping injecting the zero-sequence voltage, and the present voltage command $Vu^{*'}$ is the same as the voltage command acquired by performing the logic reversal operation on the voltage command $Vu^*$ into which the zero-sequence voltage is not injected. Further, after stopping injecting the zero-sequence voltage, the voltage commands $Vu^{*'}$, $Vv^*$ and $Vw^*$ form a three-phase output expected value. Finally, the duty ratio of the PWM signal (i.e., the control signals PWM_u, PWM_v and PWM_w) is adjusted through comparing the three-phase output expected value with the control carrier wave.

At any time, the present voltage command is compared with the control carrier wave according to the present determination logic, and whether the PWM signal is at high voltage level or low voltage level is determined according to the comparison result. In the embodiment shown in FIG. 8, at time t2, since the logic reversal operation is performed on the voltage command $Vu^*$ corresponding to the output phase u, the determination logic corresponding to the output phase u is reversed from the determination logic P to the determination logic N. Accordingly, during the period from time t0 to t2, the waveform of the control signal PWM_u is determined through comparing the voltage command $Vu^*$ with the control carrier wave based on the determination logic P. During the period from time t2 to t4, the waveform of the control signal PWM_u is determined through comparing the voltage command $Vu^{*'}$ with the control carrier wave based on the determination logic N. In addition, if the logic reversal operation is not performed on the voltage command, the determination logic corresponding to that voltage command remains unchanged. Regarding the output phases v and w, since the logic reversal operation is not performed on the voltage commands $Vv^*$ and $Vw^*$. Therefore, during the period from time t0 to t4, the waveforms of the control signals PWM_v and PWM_w are always determined through comparing the voltage commands $Vv^*$ and $Vw^*$ with the control carrier wave based on the determination logic P.

In specific, during the period from time t0 to t1, the three-phase control command is compared with the control carrier wave based on the determination logic P. If the three-phase control command is greater than the control carrier wave, the PWM signal is switched to high voltage level. If the three-phase control command is less than the control carrier wave, the PWM signal is switched to low voltage level. Taking the output phase u as an example, if the voltage command $Vu^*$ of the three-phase control command is greater than the control carrier wave, the control signal PWM_u of the PWM signal is switched to high voltage level. If the voltage command $Vu^*$ of the three-phase control command is less than the control carrier wave, the control signal PWM_u of the PWM signal is switched to low voltage level. The way of determining the waveform of the PWM signal during the period from time t1 to t2 is similar to that during the period from time t0 to t1, and thus the detailed descriptions thereof are omitted herein.

During the period from time t3 to t4, the three-phase output expected value includes the voltage command $Vu^{*'}$ acquired through performing the logic reversal operation and the voltage commands $Vv^*$ and $Vw^*$ acquired without performing the logic reversal operation. Therefore, the voltage command $Vu^{*'}$ is compared with the control carrier wave based on the determination logic N. If the voltage command $Vu^{*'}$ is greater than the control carrier wave, the control signal PWM_u of the PWM signal is switched to low voltage level; and if the voltage command $Vu^{*'}$ is less than the control carrier wave, the control signal PWM_u of the PWM signal is switched to high voltage level. In addition, the voltage command $Vv^*$ is compared with the control carrier wave based on the determination logic P. If the voltage command $Vv^*$ is greater than the control carrier wave, the control signal PWM_v of the PWM signal is switched to high voltage level; and if the voltage command $Vv^*$ is less than the control carrier wave, the control signal PWM_v of the PWM signal is switched to low voltage level. Moreover, the voltage command $Vw^*$ is compared with the control carrier wave based on the determination logic P. If the voltage command $Vw^*$ is greater than the control carrier wave, the control signal PWM_w of the PWM signal is switched to high voltage level; and if the voltage command $Vw^*$ is less than the control carrier wave, the control signal PWM_w of the PWM signal is switched to low voltage level. The way of determining the waveform of the PWM signal during the period from time t2 to t3 is similar to that during the period from time t3 to t4, and thus the detailed descriptions thereof are omitted herein.

In summary, the present disclosure provides a power conversion circuit for driving motor and a control method thereof to reconstruct the vectors through reversing the determination logic rather than the carrier wave. Consequently, the capacitor ripple is reduced, thereby reducing the temperature increment of capacitor and lengthening the lifespan of capacitor. Meanwhile, the driving loss of motor is reduced, and the driving efficiency is improved. In addition, the control method of the present disclosure may be implemented by the existing controller (e.g., microprocessor) to realize the PWM, and no additional hardware (e.g., FPGA) is required for processing PWM.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A control method of a power conversion circuit, comprising:
comparing a three-phase control command with a control carrier wave to acquire a PWM signal;
providing the PWM signal to drive a plurality of switches of the power conversion circuit to switch an input power for generating a three-phase output power;
identifying whether a phase difference between a voltage and a current of the three-phase output power falls within a preset phase range;
if the phase difference falls within the preset phase range, determining whether a zero-sequence voltage is a positive voltage or a negative voltage according to the voltage and the current of the three-phase output power;
injecting the zero-sequence voltage into the three-phase control command to acquire a three-phase synthesized command, and detecting a maximum voltage value and a minimum voltage value of the three-phase synthesized command after a period of time;
according to the zero-sequence voltage determined to be the positive voltage or the negative voltage, selecting the maximum voltage value or the minimum voltage value to perform a logic reversal operation;
after completing the logic reversal operation and stopping injecting the zero-sequence voltage, acquiring a three-phase output expected value; and
comparing the three-phase output expected value with the control carrier wave for adjusting a duty ratio of the PWM signal.

2. The control method according to claim 1, further comprising:
before injecting the zero-sequence voltage into the three-phase control command to acquire the three-phase synthesized command, adjusting the duty ratio of the PWM signal to 100% or 0%.

3. The control method according to claim 1, further comprising:
after determining that the zero-sequence voltage is the positive voltage, detecting a maximum value of the three-phase control command;
detecting a peak value of the control carrier wave in a switching cycle;
calculating a first voltage difference between the peak value and the maximum value of the three-phase control command, wherein the first voltage difference is a voltage value of the positive voltage; and
superposing the voltage value of the positive voltage on the three-phase control command to form the three-phase synthesized command.

4. The control method according to claim 3, further comprising:
selecting the maximum voltage value of the three-phase synthesized command, and performing the logic reversal operation on the maximum voltage value according to a logic reversal equation,
wherein the logic reversal equation is:

$$V1^{*'}=1-V1^{*},$$

where $V1^{*}$ is the maximum voltage value, and $V1^{*'}$ is the maximum voltage value after completing the logic reversal operation.

5. The control method according to claim 1, further comprising:
after determining that the zero-sequence voltage is the negative voltage, detecting a minimum value of the three-phase control command;
detecting a valley value of the control carrier wave in a switching cycle;
calculating a second voltage difference between the valley value and the minimum value of the three-phase control command, wherein the second voltage difference is a voltage value of the negative voltage; and
superposing the voltage value of the negative voltage on the three-phase control command to form the three-phase synthesized command.

6. The control method according to claim 5, further comprising:
selecting the minimum voltage value of the three-phase synthesized command, and performing the logic reversal operation on the minimum voltage value according to a logic reversal equation,
wherein the logic reversal equation is:

$$V2^{*'}=1-V2^{*},$$

where $V2^{*}$ is the minimum voltage value, and $V2^{*'}$ is the minimum voltage value after completing the logic reversal operation.

7. The control method according to claim 1, further comprising:
if determining that the phase difference does not fall within the preset phase range, detecting a minimum control voltage of the three-phase control command;
performing the logic reversal operation on the minimum control voltage according to a logic reversal equation;
after completing the logic reversal operation on the minimum control voltage, acquiring a three-phase output command; and
comparing the three-phase output command with the control carrier wave for adjusting the duty ratio of the PWM signal.

8. The control method according to claim 7, wherein the logic reversal equation is:

$$V3^{*'}=1-V3^{*},$$

where $V3^{*}$ is the minimum control voltage, and $V3^{*'}$ is the minimum control voltage after completing the logic reversal operation.

9. The control method according to claim 1, further comprising:
when comparing the three-phase control command with the control carrier wave, determining whether the PWM signal is at a high voltage level or a low voltage level according to a comparison result,
wherein if the three-phase control command is greater than the control carrier wave, the PWM signal is switched to the high voltage level, and
if the three-phase control command is less than the control carrier wave, the PWM signal is switched to the lower voltage level.

10. The control method according to claim 9, further comprising:
when comparing the three-phase output expected value with the control carrier wave, determining whether the PWM signal is at the high voltage level or the low voltage level according to a comparison result, wherein the three-phase output expected value comprises a first voltage value acquired through performing the logic reversal operation and a plurality of second voltage values acquired without performing the logic reversal operation,
wherein if the first voltage value is greater than the control carrier wave, the corresponding PWM signal is switched to the low voltage level, and if the first voltage value is less than the control carrier wave, the corresponding PWM signal is switched to the high voltage level,
wherein if the second voltage value is greater than the control carrier wave, the corresponding PWM signal is switched to the high voltage level, and if the second voltage value is less than the control carrier wave, the corresponding PWM signal is switched to the low voltage level.

11. The control method according to claim 1, wherein the preset phase range is between −30° and +30° or between 150° and 210°, and the control carrier wave is a triangle wave.

12. A power conversion circuit for driving a motor, comprising:
a plurality of switch assemblies, each comprising an upper bridge transistor and a lower bridge transistor, wherein first terminals of all the upper bridge transistors are electrically connected to each other, second terminals of all the lower bridge transistors are electrically connected to each other, and in each switch assembly, a second terminal of the upper bridge transistor is electrically connected to a first terminal of the lower bridge transistor;
a DC bus capacitor, configured to receive an input power, wherein a first terminal of the DC bus capacitor is electrically connected to the first terminals of all the upper bridge transistors, and a second terminal of the DC bus capacitors is electrically connected to the second terminals of all the lower bridge transistors; and
a controller, comparing a three-phase control command with a control carrier wave to acquire a plurality of PWM signals,
wherein each of the plurality of switch assemblies receive a corresponding one of the plurality of PWM signals, in each of the plurality of switch assemblies, according to the received corresponding one of the plurality of PWM signals, the upper bridge transistor is selectively turned on or off, the lower bridge transistor is selectively turned on or off, and the plurality of switch assemblies switches the input power to generate a three-phase output power for driving the motor,
wherein if the controller identifies that a phase difference between a voltage and a current of the three-phase output power does not fall within a preset phase range, the controller detects a minimum control voltage of the three-phase control command,
wherein the controller performs a logic reversal operation on the minimum control voltage to acquire a three-phase output command, and
wherein the controller compares the three-phase output command with the control carrier wave for adjusting a duty ratio of each of the plurality of PWM signals.

13. The power conversion circuit according to claim 12, wherein the controller performs the logic reversal operation on the minimum control voltage according to a logic reversal equation which is:

$$V4^{*\prime}=1-V4^{*},$$

where $V4^{*}$ is the minimum control voltage, and $V4^{*\prime}$ is the minimum control voltage after completing the logic reversal operation.

14. The power conversion circuit according to claim 12, wherein if the controller identifies that the phase difference between the voltage and the current of the three-phase output power falls within the preset phase range, the controller compares the three-phase control command with the control carrier wave to determine whether a zero-sequence voltage is a positive voltage or a negative voltage,
the controller injects the zero-sequence voltage into the three-phase control command to acquire a three-phase synthesized command, and the controller detects a maximum voltage value and a minimum voltage value of the three-phase synthesized command after a period of time,
according to the zero-sequence voltage determined to be the positive voltage or the negative voltage, the controller selects the maximum voltage value or the minimum voltage value to perform the logic reversal operation,
the controller acquires a three-phase output expected value after completing the logic reversal operation and stopping injecting the zero-sequence voltage, and
the controller compares the three-phase output expected value with the control carrier wave for adjusting the duty ratio of each of the plurality of PWM signals.

15. The power conversion circuit according to claim 14, wherein before injecting the zero-sequence voltage into the three-phase control command to acquire the three-phase synthesized command, the controller adjusts the duty ratio of each of the plurality of PWM signals to 100% or 0%.

* * * * *